United States Patent [19]

Lupke

[11] Patent Number: 4,689,174
[45] Date of Patent: Aug. 25, 1987

[54] PRODUCING DOUBLE-WALLED HELICALLY WOUND THERMOPLASTIC PIPE WITH A CORRUGATED CUTTER WALL AND A SMOOTH INNER WALL

[76] Inventor: Manfred A. A. Lupke, 92 Elgin St., Thornhill, Ontario, Canada, L3T 1W6

[21] Appl. No.: 916,844

[22] Filed: Oct. 8, 1986

Related U.S. Application Data

[63] Continuation of Ser. No. 593,276, Mar. 26, 1984, abandoned.

[30] Foreign Application Priority Data

Jul. 12, 1983 [CA] Canada ................................ 432259

[51] Int. Cl.⁴ ............................ B31F 1/20; B31F 1/28
[52] U.S. Cl. ................................ 156/470; 156/143; 156/144; 156/195; 156/205; 156/210; 156/244.13; 156/294; 156/471; 264/173; 264/286; 425/370; 425/380; 425/403; 425/DIG. 16; 425/396
[58] Field of Search ................ 156/143, 144, 195, 205, 156/210, 292, 244.13, 244.15, 294, 428, 429, 470, 471; 264/103, 173, 286; 425/380, 381, 403, 466, 467, 367, 370, 326.1, DIG. 14, DIG. 16, 396

[56] References Cited

U.S. PATENT DOCUMENTS

| | | | |
|---|---|---|---|
| 4,292,113 | 9/1981 | Hirata | 156/244.15 |
| 4,368,088 | 1/1983 | Asakura et al. | 156/143 |
| 4,510,013 | 4/1985 | Lupke et al. | 156/244.15 |
| 4,521,270 | 6/1985 | Lupke | 156/143 |
| 4,575,400 | 3/1986 | Ueda | 156/195 |

FOREIGN PATENT DOCUMENTS 1109221 9/1981 Canada .

Primary Examiner—Willard E. Hoag
Assistant Examiner—Timothy W. Heitbrink

[57] ABSTRACT

A system is disclosed for the production of double-walled helically wound thermoplastic pipe. The apparatus includes an endless former (10) of the axially advancing and rotating type for forming a band of thermoplastic material (24) into a corrugated outer wall (26). An internal extruding device (28) extends along the core of the former and extrudes a second band (34) of thermoplastic material onto the interior of the outer wall. A cold shoe (36) presses the inner wall against the outer wall to form a smooth inner wall (42) of the double-walled pipe. It is also possible to provide for the insertion of a reinforcing profile in the corrugations of the outer wall.

4 Claims, 4 Drawing Figures

PRODUCING DOUBLE-WALLED HELICALLY WOUND THERMOPLASTIC PIPE WITH A CORRUGATED CUTTER WALL AND A SMOOTH INNER WALL

This application is a continuation, of application Ser. No. 06/593,276, filed Mar. 26, 1984 now abandoned.

The present invention relates to a system for the production of helically wound thermoplastic pipe comprising extruder means for extruding a band of thermoplastic material, a former for receiving the extruded band, forming the band into a corrugated configuration and helically winding the formed band into a corrugated tube.

A system of this type is disclosed in U.S. Pat. No. 4,521,270 of Manfred A. A. Lupke, filed Apr., 6, 1983. Other systems, using other types of former are also known for example the system, described in Canadian Pat. No. 1,109,221 issued Sept. 22, 1981 to Toyo Kagako Kabushiki Kaisha (Toyo Chemical Co.).

According to the present invention, there is provided a system of the above type that also includes: a second extruder extending through the former and having a die located downstream of the former for extruding a second band of thermoplastic material onto the inside of the corrugated tube; a shoe for engaging the second band as it emerges from the die of the second extruder means and for pressing the second band into engagement with the inside of the corrugated wall such that the second band forms a non corrugated tube fused to the inside of the corrugated tube; and cooling means for cooling the shoe.

The double-walled pipe produced by the system is quite rigid, yet relatively light in weight. It is particularly useful where large diameter, relatively rigid pipe with a smooth inner wall is required.

The second extruder means may include an elongate tube extending along the inside of the former, with the die mounted on the tube beyond the end of the former. The shoe may desirably be a curved plate, cooled by a chilled cooling medium, either liquid or gaseous.

In some embodiments, provision may be made for inserting a reinforcing profile, for example a small diameter corrugated tube or a metal coil, into the corrugations between the inner and outer walls. This may be done by guiding the profile through the mandrel and into the corrugations of the corrugated tube upstream of the die. The second band is then extruded over the inside of the outer tube and the reinforcing profile.

Where a reinforcing profile is inserted, the system may be equipped with a profile cut-off and a mechanism for interrupting the feed of the profile for a selected interval to accomodate the incorporation of bell or a spigot in the pipe, for example as described in the previously referred to U.S. Pat. No. 4,521,270.

In the accompanying drawings, which illustrate exemplary embodiments of the present invention:

Figure 1:
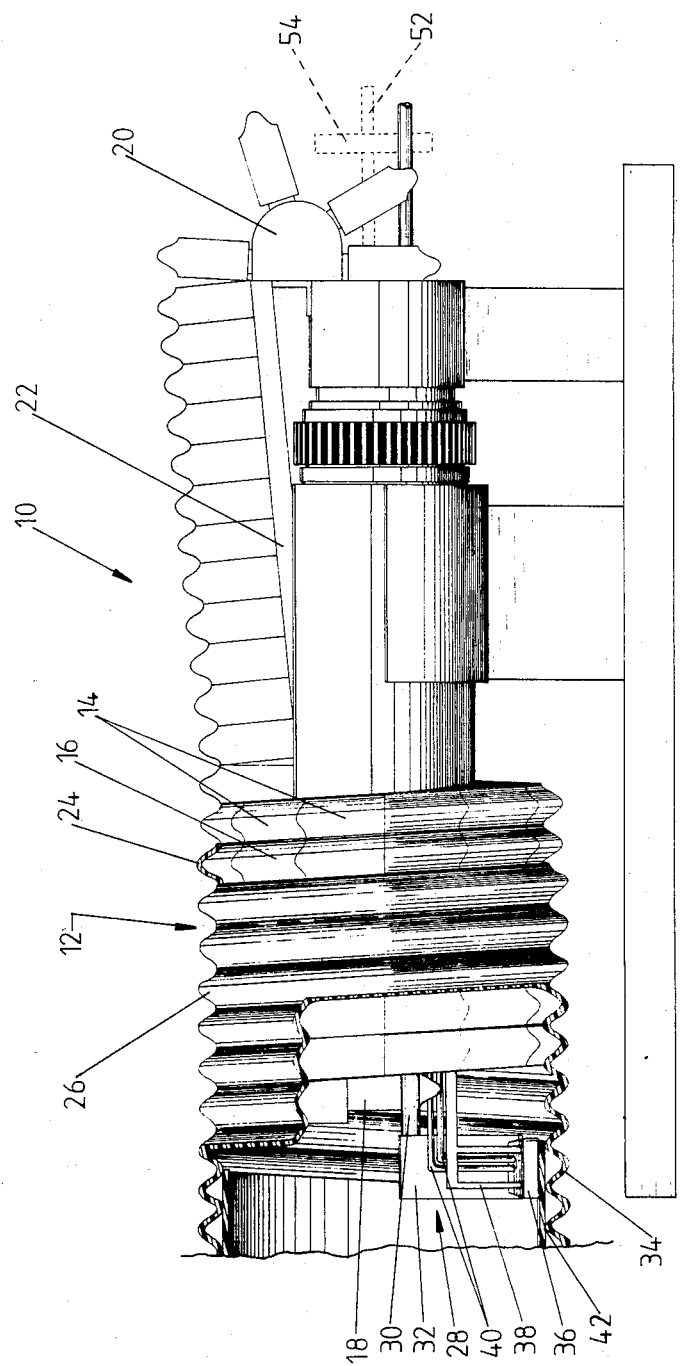
FIG. 1 is a side elevation, partially broken away, showing a system according to the present invention.
Figure 2:
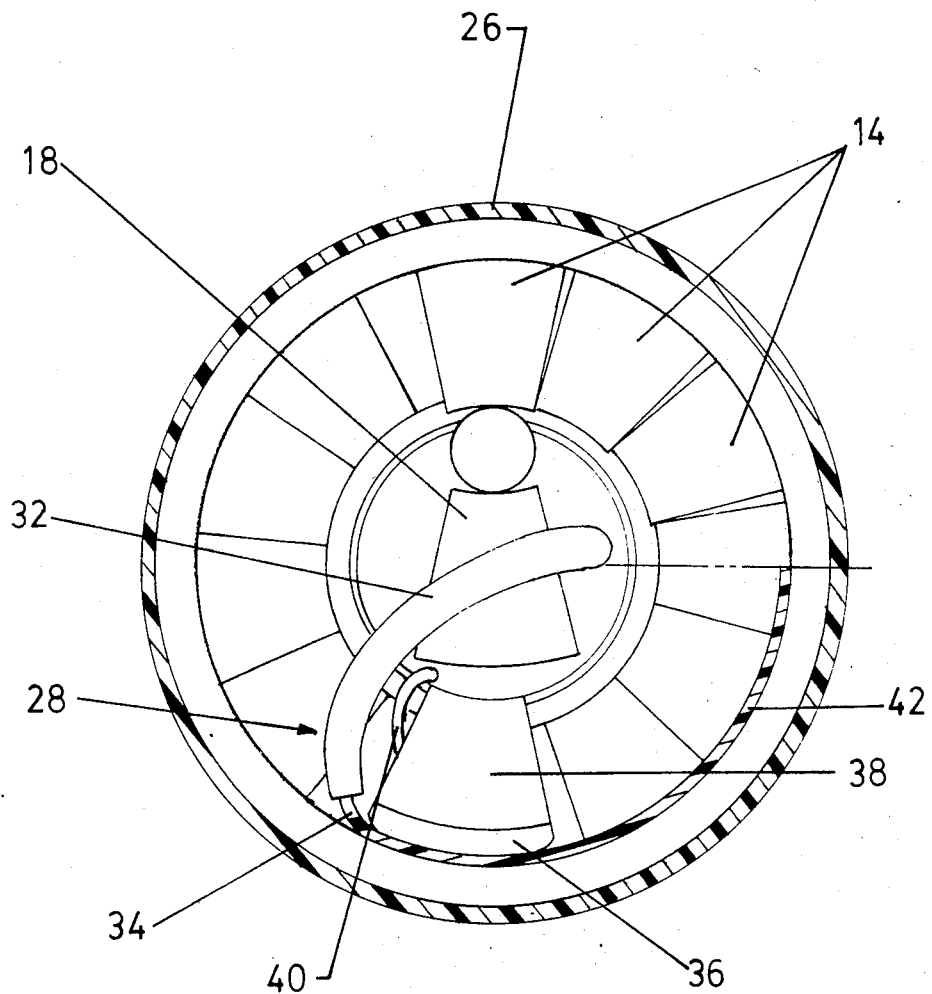
FIG. 2 is a section along line II—II, FIG. 1.

Referring to the drawings, and most particularly to FIGS. 1 and 2, there is illustrated a system 10 for the production of spirally wound thermoplastic pipe. The illustrated system is similar to that described in the previously referred to U.S. Pat. No. 4,521,270. The system has a former 12 composed of a series of moldblocks 14 travelling on a helical track to define an axially advancing and rotating mandrel surface 16. At the downstream end of the former, the blocks are retracted radially and then inverted to the position shown by moldblock 18 in FIGS. 1 and 2. That moldblock is then driven in an upstream direction along the core of the former to a run-in mechanism 20 at the upstream end. The run-in mechanism turns over the inverted blocks and feeds them into a ramp 22 which discharges into the upstream of the helical track on which the blocks run.

An extruder with a die (not shown) produces a band 24 of thermoplastic material that is fed onto the upstream end of the mandrel surface 16 where the band is formed into a corrugated configuration matching that of the mandrel surface and helically wound to form a corrugated tube 26. Additional instrumentalities such as pressers, heaters and coolers may be employed for assisting in the formation of the corrugated tube, as necessary.

The illustrated apparatus includes a second extruder means 28 with a die tube 30 extending along the centre of the former and a die 32 mounted on the end of the tube. Molten termoplastic material is forced through the tube 30 to the die 32 where it is extruded as a band 34 onto the inside of the corrugated tube 26. The band then passes under a shoe 36 mounted on a stationary part of the former core by a mounting bracket 38. The shoe is cooled internally by a cooling fluid cycled through the shoe by coolant lines 40 passing along the core of the former. The band 34 is wound onto the inside of the corrugated tube 26 as the corrugated tube rotates and advances axially. This produces an inner smooth tube 42 fused to the inside of the corrugated tube 26. The composite structure is a rigid double-walled pipe.

Figure 3:
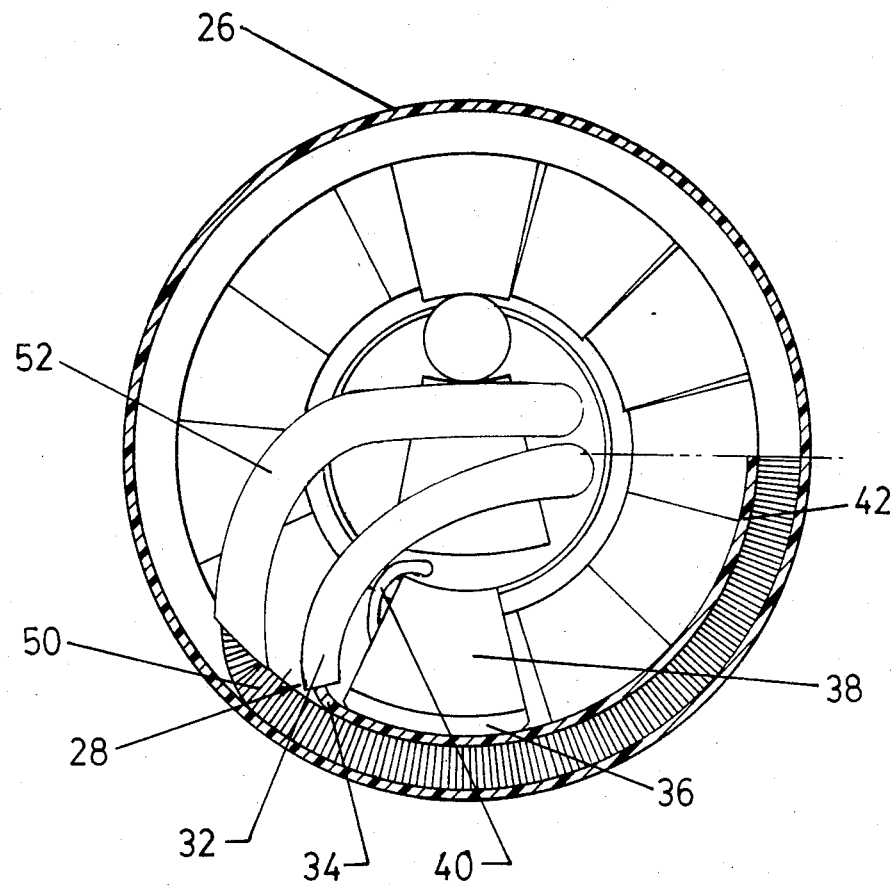
FIG. 3 is a section along line III—III of FIG. 1, showing the use of the reinforcing profile.
Figure 4:
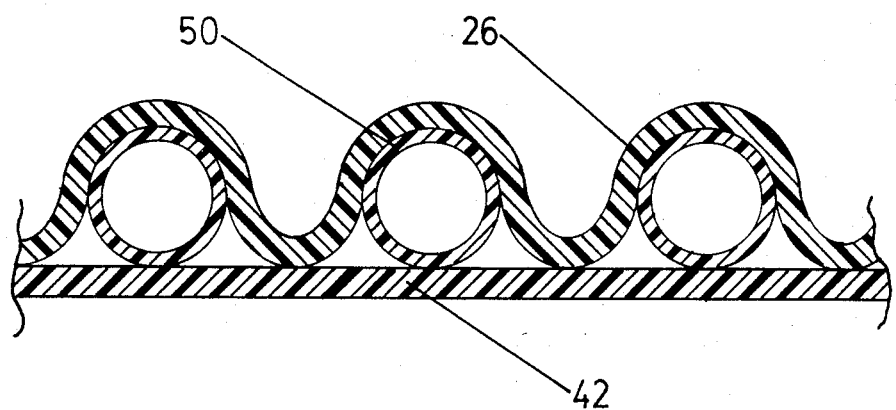
FIG. 4 is an axial section of a pipe produced according to the system of FIG. 3.

FIG. 3 illustrates a system like that of FIGS. 1 and 2 but with the additional provision of a mechanism for inserting a reinforcing profile in the corrugations of the double-walled pipe. The reinforcing profile illustrated in FIG. 3 is a corrugated tube 50 that is fed through a guide tube 52 along the core of the mandrel and discharges from the guide tube into the corrugation of the outer tube 26 just upstream of the position where the thermoplastic band 34 that forms the inner tube is extruded from the die head 32. A cross section of the resultant pipe is illustrated in FIG. 4 where the reinforcing profile 50 is enclosed in the helical corrugation between the outer tube 26 and the inner tube 42.

In some embodiments of the system, it is desirable to provide for the insertion of bells and spigots in the pipe being produced. This is done with a moldblock switching system such as that described in the previously mentioned U.S. patent. To accommodate this, the system for inserting the reinforcing profile 50 may be equipped with a cut off 54 in the guide tube 52 at the upstream end of the apparatus, as shown in broken lines in FIG. 1. The operation of the cut off 54 can be timed so that the end of the reinforcing profile 50 emerges from the downstream end of the guide tube 52 just before a bell or spigot in the outer tube. To accomodate bells, the shoe 36 is constructed to move radially outwards to press the band 34 against the inner surface of the smooth bell that will be formed in the outer tube 26.

In some embodiments of the invention, it may be desirable to provide the die tube 30 with thermal insulation and possibly additional heating to ensure that the plastic in the relatively long tube does not set.

I claim:

1. A system producing double-walled corrugated thermoplastic pipes having an outer corrugated wall and an inner smooth wall fused to said outer wall, the system comprising:

an extruder means including a first and second dies having substantially rectangular extrusion orifices for extruding accordingly a first and second bands of thermoplastic materials for forming appropriately said outer and inner walls;

a former having a rotating lateral surface adapted to receive, corrugate and helically wind the first band into said outer corrugated wall, the first and second dies being located appropriately upstream and downstream of the former, the second band being laid inside said outer corrugated wall, the second die communicating with the extruder means via an elongate tubing mounted inside the former and said extrusion orifices being situated substantially across the former and the produced pipe which is rotated and axially advanced;

a cooled pressing element conforming to said smooth inner wall, engaging the second band as it emerges from the second die and pressing the second band to said outer corrugated wall to fuse them together.

2. The system of claim 1 further comprising means for guiding a reinforcing profile through the former and into the corrugations of the corrugated tube upstream of the second die.

3. The system of claim 2 including means for severing the reinforcing profile and interrupting the feed thereof for a selected interval.

4. The system of claim 3 comprising means for displacing the pressing element outwardly during said selected interval.

* * * * *